United States Patent [19]

Heinz et al.

[11] Patent Number: 5,071,896

[45] Date of Patent: Dec. 10, 1991

[54] POLYAMIDE MOULDING COMPOUNDS WITH IMPROVE PROCESSIBILITY

[75] Inventors: Hans-Detlef Heinz, Krefeld; Joachim Döring, Langenfeld; Walter Schmitt, Neuss; Harald Pielartzik, Krefeld, all of Fed. Rep. of Germany

[73] Assignee: Bayer Aktiengesellschaft, Leverkusen, Fed. Rep. of Germany

[21] Appl. No.: 632,536

[22] Filed: Dec. 24, 1990

[30] Foreign Application Priority Data

Jan. 11, 1990 [DE] Fed. Rep. of Germany ....... 4000626

[51] Int. Cl.$^5$ .................................................. C08K 5/21
[52] U.S. Cl. ..................................... 524/212; 524/211; 524/227
[58] Field of Search ........................ 524/211, 212, 227

[56] References Cited

U.S. PATENT DOCUMENTS

| | | | |
|---|---|---|---|
| 3,935,161 | 1/1976 | Schlichting et al. | 524/212 |
| 4,290,935 | 9/1981 | Muraki | 524/227 |
| 4,490,324 | 12/1984 | Mollison | 524/227 |
| 4,684,684 | 8/1987 | Abe et al. | 524/227 |

*Primary Examiner*—Paul R. Michl
*Assistant Examiner*—Peter Szekely
*Attorney, Agent, or Firm*—Connolly and Hutz

[57] ABSTRACT

This invention relates to polyamide moulding compounds with improved processibility; to a process for their preparation, to their use for the production of moulded parts, sheet products, fibres and composite materials and to the moulded parts, sheet products, fibres, semi-finished products, composite materials and other articles produced from these moulding compounds. The invention is characterized by the use of small quantities of special amides and/or ureas which impart significantly improved flowability to the moulding compounds.

9 Claims, No Drawings

POLYAMIDE MOULDING COMPOUNDS WITH IMPROVE PROCESSIBILITY

This invention relates to polyamide moulding compounds with improved processibility, to a process for their preparation, to their use for the production of moulded parts, sheet products, fibres and composite materials and to the moulded parts, sheet products, fibres, semi-finished products, composite materials and other articles produced from these moulding compounds. The invention is characterised by the use of small quantities of special amides and/or ureas which impart significantly improved flowability to the compounds.

For the processing of thermoplasts by injection moulding, a sufficiently low fusion viscosity and good mould release, and, in the case of partially crystalline thermoplasts, control of the rate of crystallization, are of greatest importance. If the fusion viscosities are too high it may be very difficult or even impossible to obtain an exact copy of the mould. If the mould release is poor, the moulded parts may stick to the mould in the process of their removal from the mould or they may warp. If crystallization is not controlled it may, for example, set in before the mould has been completely filled, with the result that the mechanical properties and surface quality of the end product may be impaired. For processing thermoplasts, therefore, it is of greatest importance to be able to control the fusion viscosity, mould release and crystallization, which affect the processibility.

Polyamides (PA) constitute a class of polymers which have for many years been found satisfactory for numerous practical applications and may be prepared by various processes and synthesised from widely differing polyamide forming units and for special applications they may be worked up alone or in combination with processing auxiliaries, polymeric alloying components and mineral reinforcing materials (e.g. fillers and glass fibres) for the production of materials with specially adjusted combinations of properties. Thus polyamides are used in large quantities for the production of fibres, synthetic resin moulded parts and sheet products and are also used e.g. as hot melt adhesives and as auxiliary agents in numerous technical applications.

Conventional types of injection moulded compounds free from reinforcements generally flow sufficiently readily but the flowability is drastically reduced in reinforced compounds and/or alloys. This is a particularly serious disadvantage since reinforced polyamides and polyamide alloys have particularly advantageous mechanical properties. This reduced flowability may thus limit the use of polyamide moulding compounds. It would therefore be desirable to overcome this disadvantage.

Lubricants for polyamides are known, e.g. silicone oils, stearic acid and their calcium or zinc salts (Kunststoffe 47, 389 (1957), long chain aliphatic esters (DAS 1 081 218), fatty alcohols, etc. (Kunstoff-Handbuch Volume VI, Polyamide, publishers Carl Hanser Verlag, Munich 166). They all have certain disadvantages, e.g. they may be insufficiently effective or when used in larger quantities they may manifest severe incompatibility or reduction in molecular weight or they may be difficult to incorporate in the compound (liquid dosing), etc.

There is therefore a demand for polyamide moulding compounds which are very readily flowable.

It has now surprisingly been found that polyamide moulding compounds containing small quantities of special amides and/or ureas have dramatically improved flowability without any of the attendant disadvantages mentioned above.

The present invention therefore relates to new, readily flowable polyamide moulding compounds, characterised in that they consist of A) from 85 to 99.9% by weight of polyamides known per se,
B) from 0.1 to 15% by weight of amides and/or ureas corresponding to the general formulae (I) to (IV)

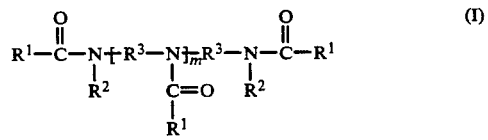

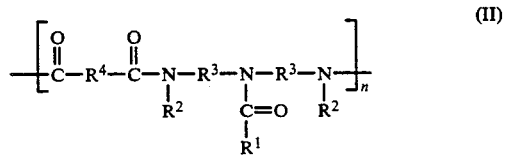

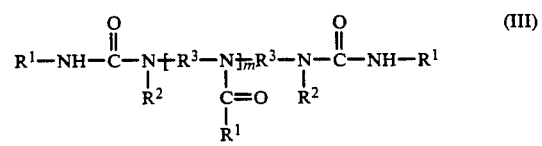

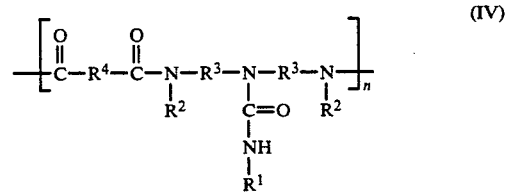

wherein
the $R^1$s denote, independently of one another, an (ar)aliphatic hydrocarbon residue having at least 5, preferably not less than 10 carbon atoms,
the $R^2$s denote, independently of one another, hydrogen or groups corresponding to formulae (V) and (VI)

preferably hydrogen,
$R^3$ and $R^4$ denote, independently of one another, a bivalent hydrocarbon group which has 2 to 10 carbon atoms and may also contain heteroatoms and may be linear or branched, open chain or cyclic and aliphatic or aromatic but is preferably an alkylene group having 2 to 6 carbon atoms and is particularly preferably $C_2H_4$ in the case of $R^3$ and $C_4H_8$ in the case of $R^4$,
m stands for an integer with a value from 1 to 50, preferably 1 to 10, most preferably 3-10, n stands for an integer chosen so that the average molecular weight ($\overline{M}n$) of the polyamidamines on which the compounds of formulae (II) and (IV) are based is at least 500, preferably at least 1000, and not more than 50,000 g.mol$^{-1}$,
and the additives corresponding to formulae (II) and (IV) may have any end groups (e.g. amine or carboxyl), and optionally C) up to 200% by weight, based on the sum of the weights of A) and B), of conventional additives.

The invention also relates to a process for the preparation of the new polyamide moulding compounds and to their use for the production of moulded articles, sheet products, fibres, semi-finished products, composite materials and other articles.

The additives B) of formulae (I) to (IV) are derived from polyamines corresponding to the general formula (VII)

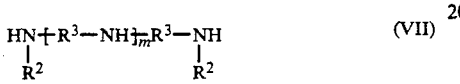

or polyamidamines corresponding to the general formula (VIII)

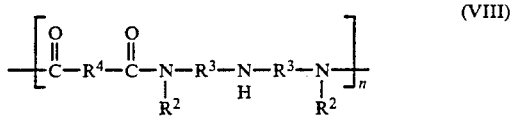

The additives may be prepared by reaction of the polyamines (VII) or polyamidamines (VIII) with carboxylic acids or derivatives thereof or urea-forming compounds, preferably isocyanates, in solution or solvent free.

They are basically known or may be prepared by known processes. The following are specific examples of compounds of formulae (I) to (IV):

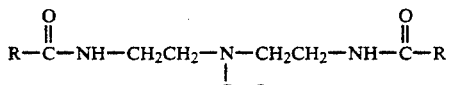

| R = | $C_{12}H_{25}$ | 1 |
| | $C_{15}H_{31}$ | 2 |
| | $C_{17}H_{35}$ | 3 |
| | $C_{22}H_{45}$ | 4 |

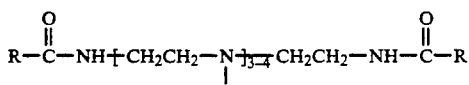

| R = | $C_{12}H_{25}$ | 5 |
| | $C_{15}H_{31}$ | 6 |
| | $C_{17}H_{35}$ | 7 |
| | $C_{22}H_{45}$ | 8 |

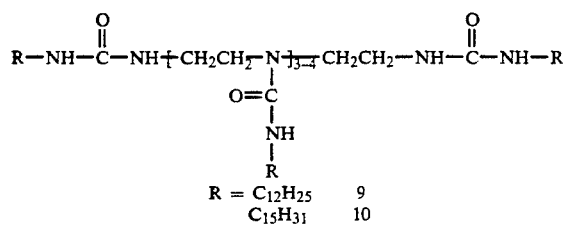

| R = | $C_{12}H_{25}$ | 9 |
| | $C_{15}H_{31}$ | 10 |
| | $C_{17}H_{35}$ | 11 |
| | $C_{22}H_{45}$ | 12 |

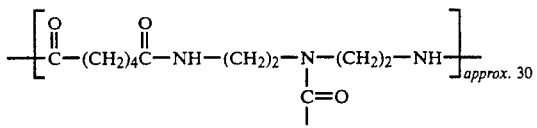

| R = | $C_{12}H_{25}$ | 13 |
| | $C_{15}H_{31}$ | 14 |
| | $C_{17}H_{35}$ | 15 |
| | $C_{22}H_{45}$ | 16 |

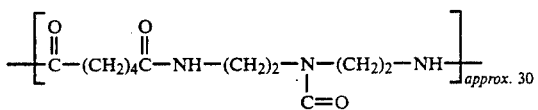

| R = | $C_{12}H_{35}$ | 17 |
| | $C_{15}H_{31}$ | 18 |
| | $C_{17}H_{35}$ | 19 |
| | $C_{22}H_{45}$ | 20 |

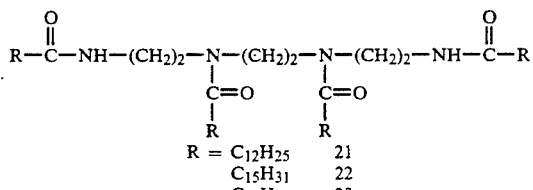

| R = | $C_{12}H_{25}$ | 21 |
| | $C_{15}H_{31}$ | 22 |
| | $C_{17}H_{33}$ | 23 |
| | $C_{22}H_{45}$ | 24 |

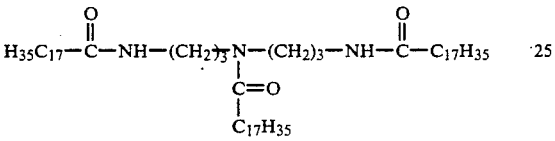

25

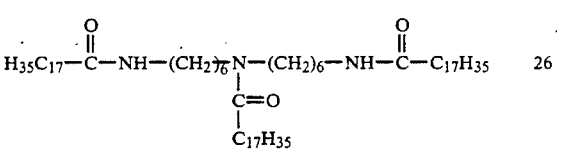

26

The additives B) of formulae (I) to (IV) may in principle be prepared by any methods known to the man of the art for the preparation of amides or ureas from amines.

The additives of formulae (I) and (II) are preferably prepared from the corresponding polyamines of formulae (VII) or (VIII) by solvent free amidation with carboxylic acids, optionally with the aid of conventional catalysts. Temperatures from about 160° C. to about 280° C. are suitable, depending on the particular additive. The additives of formulae (I) and (II) may contain part of their acids, preferably less than 50 mol %, in particular less than 25 mol %, in the form of the salts of polyamines and acids instead of as amides. Mixtures of acids may also be used. Carboxylic acids or carboxylic acid derivatives having less than 6 carbon atoms may in part also be used, e.g. acetic acid, but the carboxylic acid residues R$^1$ should predominate.

In the case of compounds (I), for example, one acid may be used first to amidate e.g. the primary amino groups and the second may then be used to amidate the secondary amino groups.

The following are examples of suitable acids from which the groups $R^1$ may be derived: lauric acid, myristic acid, hexadecanoic acid (Palmitic acid), octadecanoic acid (stearic acid) and docosanoic acid (behenic acid). These are also the preferred acids.

Diethylene triamine and its higher homologues, dipropylene triamine and bis-hexamethylene triamine, are preferred polyamines (VII).

The additives of formulae (I) and (II) may also be prepared in solution by reaction of the carboxylic acids or suitable derivatives thereof, e.g. acid chlorides, with the compounds of formulae (VII) and (VIII). Processes for carrying out this reaction are known.

The additives of formulae (I) and (II) may also contain small quantities of excess carboxylic acid and/or amine groups. Further, compounds (I) and (III) may also contain a certain proportion ($\leq 20\%$) of tertiary amino groups or rings derived from the polyamines (VII).

The compounds of formulae (III) and (IV) are prepared from the amines of formulae (VII) and (VIII) by a reaction with urea-forming reactants, preferably isocyanates. The isocyanates used may be those corresponding to the acids $R^1$—COOH. The reaction is preferably carried out in solution. Processes for this reaction are known.

The polyamidamines of formula (VIII) may contain other polyamide forming units in addition to the dicarboxylic acids and the triamine, preferably caprolactam. The triamine may be partly or completely replaced by higher polyamines. The compounds of formula (VIII) are preferably synthesised from adipic acid and diethylene triamine and optionally caprolactam in addition.

Examples of preparation for the additives to be used according to the invention may be found in the Examples section. For further information on the preparation of the additives see our own, hitherto unpublished application P 3 921 259.9 (LeA 26 941). The completed moulding compounds contain the additives in quantities of from 0.1 to 15% by weight, preferably from 0.5 to 8% by weight, most preferably from 1 to 5% by weight.

The compounds to be used according to the invention are either known as such or may be prepared by known processes. They may be used singly or as any mixtures.

In addition to the compounds of formulae (I) to (IV), the polyamide moulding compounds may contain additives as defined under C), e.g. fillers and/or reinforcing materials (glass fibres, glass beads, aramide fibres, carbon fibres, mineral fillers, etc.), plasticisers, further flow improving auxiliaries, UV stabilizers, antioxidants, pigments, dyes, mould release agents, antisofteners, additives to reduce water absorption (preferably monophenols, bisphenols such as bisphenol A and (alkyl)phenolformaldehyde novolaks), nucleating agents, crystallization accelerators or retarders and polymeric alloying components (e.g. the impact modifiers known in the literature, etc.). They may be used alone or as concentrates.

Particularly suitable additional flow improving auxiliaries are the low molecular weight, liquid-crystalline additives according to our own unpublished patent application P3 914 048.2 (LeA 26 824).

The following are examples of suitable polymeric alloying components: diene rubbers, acrylate rubbers, polyethylenes, polypropylenes, ethylene/propylene copolymers, ethylene/1-butene copolymers, ethylene/propylene/diene terpolymers, ethylene/acrylic acid/acrylic acid ester terpolymers, ethylene/vinyl acetate copolymers, polyoctenylenes, polystyrenes, (α-methyl)-styrene/(meth)acrylonitrile copolymers, (meth)acrylonitrile/butadiene/(α-methyl)styrene polymers (ABS), impact resistant polystyrenes, polycarbonates, aromatic polyester (carbonates), polyesters such as polyethylene terephthalate, polysulphones, polyphenylene oxides, polyether ketones, polyether ether ketones, polyamidamides, polyether sulphones, polyether imides, polyester imides and polyimides of the kind known in the art as alloying partners or modifiers.

The polymeric alloying components should, if necessary, be chemically modified, at least partly, so that partial coupling of the two phases will take place. This may be achieved, for example, by using a copolymer of ethylene and/or propylene and small quantities of acrylic acid or an ethylene/propylene (diene) polymer grafted with small quantities of maleic acid anhydride, or polyphenylene oxide grafted with small quantities of maleic acid anhydride, either alone or as a mixture with unmodified alloying components. Coupling may also take place via ester and epoxide groups. Further, it may be achieved e.g. by ensuring the presence of suitable low molecular weight or polymeric agents for imparting compatibility, e.g. an acrylontrile/styrene/acrylic acid terpolymer may be used as compatibility imparting agent in alloys containing ABS. The alloying components may also contain reactive end groups capable of reacting with the polyamide, e.g. amino terminated or carboxyl terminated polydiene rubbers.

The rubbers may also be grafted in a core/sheath structure.

Mixtures of polyamides with other polymers and/or alloying components may also be prepared according to the invention, e.g. alloys of PA 66, polyphenylene oxide and high impact strength polystyrene or alloys of PA 66, aromatic polyesters and impact strength modifiers or alloys of polyamide 6, (meth)acrylonitrile/(α-methyl)-styrene copolymers and polybutadiene- or acrylate-graft rubbers described in the art as impact strength modifiers.

Amorphous polyamides compatible and/or incompatible with the polyamides to be used according to the invention may also be used as additives. For example, PA 6 I (polyhexamethylene isophthalamide) or polyamides of isophthalic acid, terephthalic acid, hexamethylene diamine and optionally 4,4'-diamino dicyclohexyl methane may be used as amorphous polyamides.

In mixtures and/or alloys containing other polymers in addition to the polyamides to be used according to the invention, the proportion of polyamides used according to the invention (e.g. PA 6, 66 and copolyamides thereof) should not be less than about 40% by weight, preferably not less than about 50% by weight.

Preferred alloying components are those conventionally used for increasing the impact strength in the cold and/or dry state (impact strength modifiers) and amorphous thermoplasts having glass temperatures of at least 90°C., preferably at least 120° C., most preferably not less than 140° C.

Partially crystalline and amorphous polyamides or mixtures thereof are suitable polyamides A according to the invention. PA 6, 66, 6T/6, 610, 1212, 11, 12 and 46 and copolymides based on PA 6 and PA 66 are preferred.

PA 6 and 66 and mixtures thereof and copolyamides based on PA 6 and 66 are particularly preferred.

Preparation of the polyamide moulding compounds according to the invention is carried out by mixing the solvent free components, preferably in kneaders or extruders. Any processes conventionally used for mixing thermoplasts may be used here.

The polyamide moulding compounds according to the invention may be worked up by, for example, the processes of injection moulding, extrusion, pultrusion, film stacking, etc. to produce moulded articles, sheet products, fibres, semi-finished products, composite materials, and other. These products are also a subject matter of this invention.

The polyamide moulding compounds according to the invention have a significantly raised flowability.

Owing to the high molecular weight of the additives B) used according to the invention, the latter are not volatile. They are generally solid and therefore easy to dose. They therefore constitute a valuable enrichment of the state of the art.

The following Examples using typical starting materials in typical quantities serve to illustrate the invention without limiting it.

The $\eta_{rel}$ values were determined on a 1% solution in m-cresol at 25° C. Percentages are percentages by weight unless otherwise indicated.

EXAMPLE 1

Preparation of N,N',N''-tris-stearoyl-diethylene triamine 3 by solvent free amidation (for use according to the invention).

154.5 g of diethylene triamine, 1280 g of stearic acid and 0.3 g of triphenyl phosphite were stirred under nitrogen for 1 hour at 180° to 220° C. and then for 4.5 hours at 260° C. After cooling, the reaction mixture was recrystallized from toluene. The yield was 1165 g of yellowish crystals with a flow point of 103° to 105° C. The basic nitrogen content was 0.11% and the carboxyl group content 0.27%.

EXAMPLE 2

Preparation of a polyamine 7 essentially completely amidated with stearic acid by solvent free amidation (for use according to the invention).

25 g of a polyethylene-polyamine mixture containing tetraethylene pentamine and pentaethylene hexamine as main components (polyamine B, a product of Bayer AG), 156 g of stearic acid and 0.1 g of triphenyl phosphite were reacted at 180° to 220° C. (1 h) and 260° C. (5 h) as described in Example 1. After recrystallization from toluene, 110 g of light brown crystals melting at 90° to 101° C. were obtained. The basic nitrogen content was 0.56% and the carboxyl group content of 0.27%.

EXAMPLES 3 TO 5 AND COMPARISON EXAMPLE 1

The amide from Example 1 was extruded with polyamide 6 granulate (72 $_{rel}$ about 4.0) at various temperatures through a ZSK 53-double shaft extruder. The rate of throughput was 30 kg h$^{-1}$.

The improvement in flowability was determined from the energy consumption of the extruder.

EXAMPLES 6 TO 9 AND COMPARISON EXAMPLE 2

The PA 6 granulate used in Examples 3 to 5 was extruded at 270° C. as previously described with the triamide 3 prepared according to Example 1 and an amide based on triethylene tetramine, stearic acid and a little acetic acid (Persoftal UK, a product of Bayer AG).

The values for energy consumption are shown in Table 1.

TABLE 1

| Example | Amide | Quantity (% by weight) | A$^1$/(A) at T (°C.) | $\eta_{rel}$ |
|---|---|---|---|---|
| 3 | 3 | 2 | 28/270 | 3.95 |
| 4 | 3 | 5 | 20/250 | 3.8 |
| 5 | 3 | 10 | 14/240 | 3.7 |
| Comp. 1 | — | — | 52/270 | 4.0 |
| 6 | 3 | 2 | 40/270 | 4.0 |
| 7 | 3 | 5 | 24/270 | 4.0 |
| 8 | Persoftal UK | 2 | 26/270 | 3.9 |
| 9 | Persoftal UK | 5 | 18/270 | 3.7 |
| Comp. 2 | — | — | 68/270 | 4.0 |

$^{1)}$Energy consumption, lower values denote better flowability

EXAMPLES 10 TO 13 AND COMPARISON EXAMPLE 3

The same compounds were extruded with a high molecular weight PA 6 ($\eta_{rel}$ about 5) by the method described for Examples 6 to 9 (throughput rate: 24 kg h$^{-1}$).

The data for the energy consumption are shown in Table 2.

TABLE 2

| Example | Amide | Quantity (% by weight) | A/(A) at T (°C.) | $\eta_{rel}$ |
|---|---|---|---|---|
| 10 | 3 | 2 | 24/275 | 4.4 |
| 11 | 3 | 5 | 14/270 | 4.5 |
| 12 | Persoftal UK | 2 | 14/270 | 4.4 |
| 13 | Persoftal UK | 5 | 12/270 | 4.2 |
| Comp. 3 | — | — | 70/280 | 4.6 |

EXAMPLES 14 AND 15 AND COMPARISON EXAMPLE 4

A low viscosity PA 6 ($\eta_{rel}$=2.9) was extruded with the compounds used in the previous Examples in the manner described for Examples 3 to 5.

The data for the energy consumption are shown in Table 3.

TABLE 3

| Example | Amide | Quantity (% by weight) | A/(A) at T (°C.) | $\eta_{rel}$ |
|---|---|---|---|---|
| 14 | 3 | 2 | 23/230 | 3.0 |
| 15 | Persoftal UK | 2 | 23/230 | 2.9 |
| Comp. 4 | — | — | 35/240 | 3.0 |

EXAMPLES 16 TO 19 AND COMPARISON EXAMPLES 5 TO 7

A medium viscosity PA 6 ($\eta_{rel}$=3.5), amide 3 and polyphenolic compounds were mixed dry and extruded (260° C.) in the manner described for Examples 6 to 9.

The data for the energy consumption of these samples and for those without amide 3 are summarized in Table 4.

TABLE 4

| Example | Amide 3 (%) | Polyphenol | Quantity (%) | A(A) | $\eta_{rel}$ |
|---|---|---|---|---|---|
| 16 | 1 | Novolak[1] | 10 | 24 | 3.15 |
| 17 | 2 | Novolak[1] | 10 | 20 | 3.0 |
| 18 | 1 | Bisphenol A | 10 | 22 | 3.15 |
| 19 | 2 | Bisphenol A | 10 | 18 | 3.1 |
| Comp. 5 | — | Novolak[1] | 10 | 27 | 3.2 |
| Comp. 6 | — | bisphenol A | 10 | 23 | 3.1 |
| Comp. 7 | — | — | — | 54 | 3.6 |

[1]Phenol-formaldehyde condensate (phenol : $CH_2O$ = 1:0.78)

As the Examples show, the additives to be used according to the invention are very efficient flow improvers which are effective even in very small quantities.

In addition, they may act as crystallization retarders, as shown in Table 5. This may result in improved surfaces on the moulded products.

TABLE 5[1]

| Example | $T_S$ (°C.) | $\Delta H_S$ (J/g) | $T_k$ (°C.) | $\Delta H_K$ (g/g) |
|---|---|---|---|---|
| 19 | 214.0 | 55.5 | 163.5 | 54.7 |
| Comp. 6 | 215.7 | 55.5 | 165.2 | 57.4 |
| Comp. 7 | 220.6 | 61.3 | 172.1 | 61.7 |

[1]determined by DSC (heating rate: 20 K. $min^{-1}$; cooling rate: 40 K. $min^{-1}$).

EXAMPLE 20 AND COMPARISON EXAMPLE 8

PA 66 ($\eta_{rel}$=3.0) was compounded with glass fibres (30%, based on the compound) and 2% (based on the compound) of the amide from Example 2 (Example 20) or 0.3% (based on the compound) of a polyethylene wax (Hostalub WE 1, a product of Höchst AG) (Comparison Example 8), (ZSM 53).

The mechanical properties and flow lengths are summarized in Table 6.

TABLE 6

|  | Example 20 | Comparison Example 8 |
|---|---|---|
| Ash content (%) | 28.8 | 28.3 |
| $\sigma_R$ (mPa) | 179 | 183 |
| $\epsilon_R$ (%) | 3.0 | 3.17 |
| $E_z$ (mPa) | 9451 | 9407 |
| $\sigma_{B3.5}$ (mPa) | 257 | 258 |
| $\sigma_B$ (mPa) | 274 | 282 |
| $E_B$ (mPa) | 8308 | 8269 |
| $a_k$[1] (KJ/$m^2$) | 10.7 | 10.9 |
| $a_n$[1] (KJ/$m^2$) | 51.3 | 53.6 |
| −30° C. | 46.0 | 46.2 |
| HDT A (°C.) | 254 | 253 |
| HDT B (°C.) | >254 | >253 |
| Flow length[2] (cm) at (280° C.) | 74 | 58 |

[1]ISO 180; $a_k$: method 1A; $a_n$: method 1c
[2]Measure of flowability. Higher values denote better flowability.

We claim:

1. Readily flowing polyamide moulding compounds, characterised in that they consist of
A) from 85 to 99.9% by weight of polyamides known per se,
B) from 0.1 to 15% by weight of amides and/or ureas corresponding to the general formulae (I) to (IV)

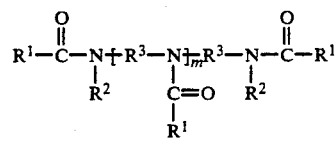 (I)

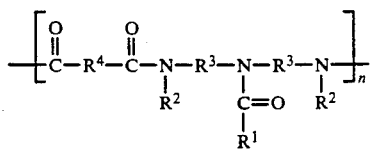 (II)

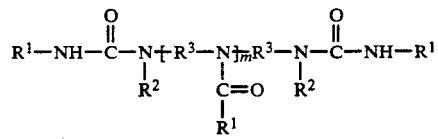 (III)

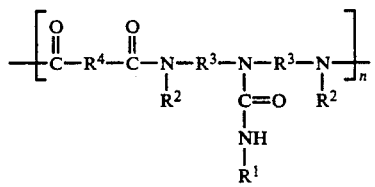 (IV)

wherein
the $R^1$s denote, independently of one another, an (ar)aliphatic hydrocarbon group having at least 5, preferably at least 10 carbon atoms,
the $R^2$s denote, independently of one another, hydrogen or residues corresponding to formulae (V) and (VI)

 (V)

 (VI)

preferably hydrogen,
$R^3$ and $R^4$ denote, independently of one another, a bivalent hydrocarbon group having 2 to 10 carbon atoms, which group may also contain heteroatoms and may be linear or branched, open chain or cyclic, aliphatic or aromatic, preferably an alkylene group having 2 to 6 C atoms and in particular $C_2H_4$ in the case of $R^3$ and $C_4H_8$ in the case of $R^4$,
m denotes an integer with a value from 1 to 50, preferably from 1 to 10, and
n denotes an integer chosen so that the average molecular weight ($\overline{M}n$) of the polyamidamines on which the compounds of formulae (II) and (IV) are based is at least 500, preferably at least 1000 and not more than 50,000 g.$mol^{-1}$,
and the additives corresponding to formulae (II) and (IV) may have any end groups (e.g. amine or carboxyl), and optionally
C) up to 200% by weight, based on the sum of the weights of A) and B), of conventional additives.

2. Polyamide moulding compounds according to claim 1, characterised in that the compounds corresponding to formulae (I) to (IV) are preferably used in quantities of from 0.5 to 8% by weight, most preferably from 1 to 5% by weight.

3. Polyamide moulding compounds according to claim 1 characterised in that inter alia the compounds 1 to 26 in particular are used as additives B).

4. Polyamide moulding compounds according to claim 1 characterised in that the compounds corresponding to formulae (I) and (III) are preferably used, most preferably those of formula (I), wherein the groups $R^1$ are preferably aliphatic groups having at least 12 carbon atoms, in particular the groups $C_{12}H_{35}$, $C_{15}H_{31}$, $C_{17}H_{35}$, $C_{20}H_{41}$, $C_{21}H_{43}$ and $C_{22}H_{45}$, either alone or as mixtures, and acids having less than 6 carbon atoms may also be used, e.g. inter alia acetic acid.

5. Polyamide moulding compounds according to claim 1 characterised in that it is particularly preferred to use PA 6, PA 66 or mixtures thereof and copolyamides based on PA 6 or 66.

6. Polyamide moulding compounds according to claim 1 characterised in that the substances used as additives C) are in particular reinforcing materials (glass fibres, mineral fillers, etc.), polymeric alloying components (in particular impact strength modifiers), other flow improvers, conventional lubricants and mould release agents, pigments and dyes, UV stabilizers, antioxidants, phenolic compounds for reducing the water absorption (in particular bisphenols and (alkyl)phenol-formaldehyde condensates) and flame retardants, alone or in combination.

7. Process for the preparation of readily flowing polyamide moulding compounds from high molecular weight polyamides with the addition of flow improvers, characterised in that A) from 85 to 99.9% by weight of high molecular weight polyamides are mixed with B) from 0.1 to 15% of amides and/or ureas of the general formulae (I) to (IV) according to claim 1, optionally with the addition of up to 200% by weight, based on the sum of the weights of A) and B), of conventional additives C) in the solvent free state in one or more stages.

8. Use of the readily flowing polyamide moulding compounds according to claim 1 for the production of moulded articles, sheet products, fibres, semi-finished products, composite materials and other articles by the processes of injection moulding extrusion, pultrusion, film stacking or other known processes for working up from the melt.

9. Moulded articles, sheet products, fibres, semi-finished products, composite materials and other articles of polyamide moulding compounds according to claim 1.

* * * * *